Patented Dec. 16, 1947

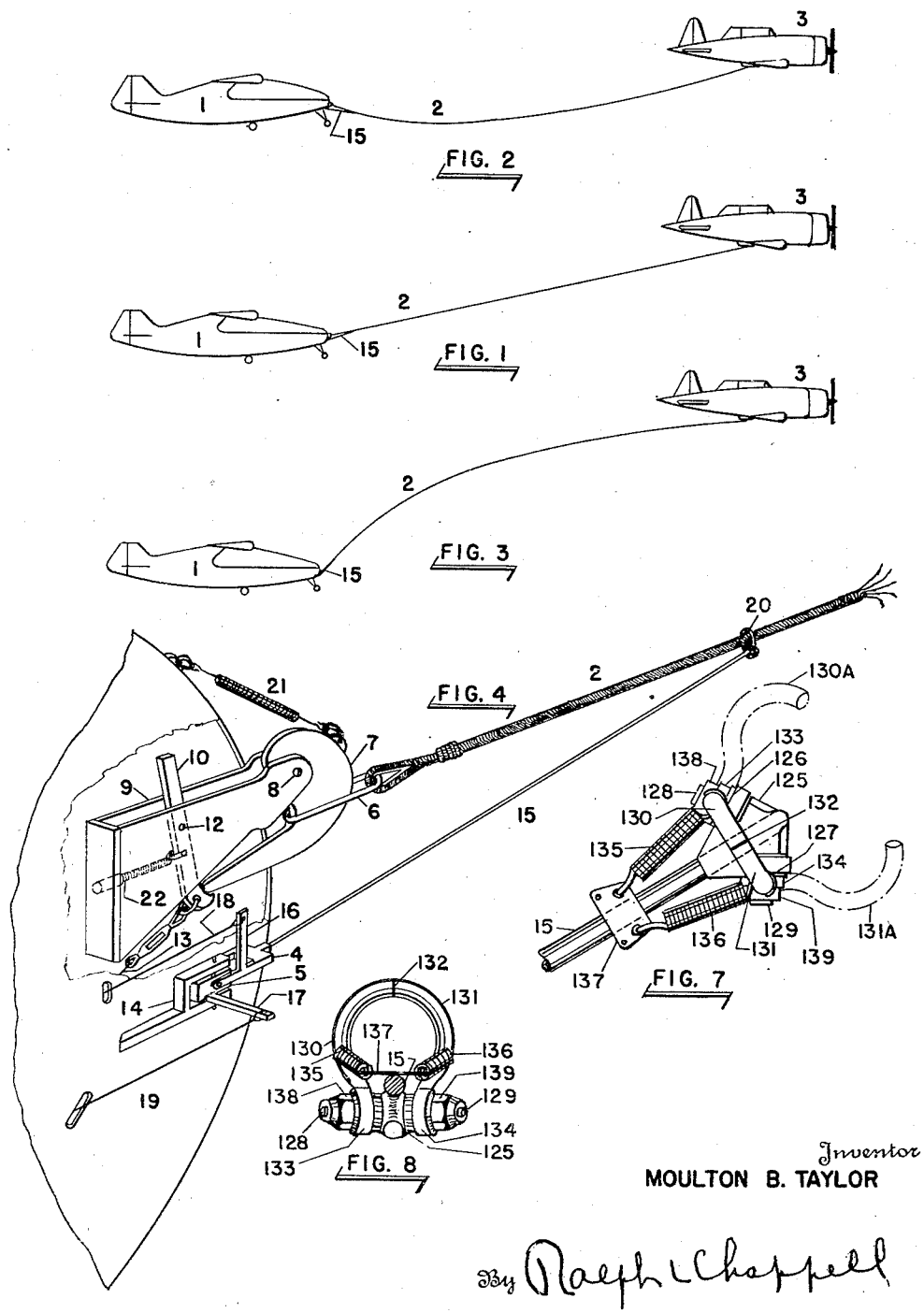

2,432,548

UNITED STATES PATENT OFFICE 2,432,548

AUTOMATIC CONTROL

Moulton B. Taylor, United States Navy

Application May 8, 1945, Serial No. 592,627

17 Claims. (Cl. 244—3)

(Granted under the act of March 3, 1883, as amended April 30, 1928; 370 O. G. 757)

My invention relates to automatic control mechanisms for bodies adapted to motion through a fluid medium.

My invention also relates to a method for automatically controlling a body adapted to motion through a fluid medium, such as an aircraft or submarine.

More particularly my invention relates to mechanism adapted to maintain an aircraft in stable flight in a predetermined position relative to an external body. The mechanism of my invention is preferably adapted to maintain a towed aircraft in stable flight and at a predetermined position relative to a towing aircraft or other towing object. In the preferred embodiment of my invention, control mechanism is provided on a towed aircraft, hereinafter referred to as a glider, to operate control airfoils of the glider in response to deviations of a towing cable from a preferred direction relative to an axis of the glider. It is to be understood that the use of the term glider is not to be considered as restricting my invention to gliders, although in the preferred embodiment my invention is described as applied to a glider. My invention is applicable to self-powered or unpowered aircraft in general, as well as to self-powered or unpowered submarines.

The control mechanism used in the preferred embodiment of my invention comprises a rod-like member or feeler mounted to a glider by a universal joint near the point of attachment of a cord or cable, the cord or cable being arranged to cause forward motion of the glider relative to the air. The forward end or tip of the rod-like member is held by a detachable coupling to the cable so that the tip follows vertical and horizontal deflections of the cable. The resulting deflections of the member are used to operate switching mechanisms or mechanical valve mechanisms for controlling power apparatus operable to change the angle of attack of control airfoils of the glider. Alternatively, mechanical connections from the rod-like member may be utilized directly to move the control airfoils.

A primary object of my invention is to provide automatic aircraft controlling mechanisms adapted to control the flight attitude of an aircraft in accordance with the position relative to the aircraft of another object, such as a towing aircraft or surface vehicle.

A specific object of my invention is to provide in a glider automatic mechanism which will control the glider in flight to cause the glider to follow a towing object, though the towing object may be executing various maneuvers.

More specifically an object of my invention is to provide controlling mechanism for a glider or train of gliders which will tend to maintain each glider in a preferred position in stable flight behind the aircraft which is towing each glider.

Another object of my invention is to provide a method of automatically controlling an aircraft in tow whereby the aircraft is caused to follow a towing aircraft or other object.

A general object of my invention is to provide a safe, efficient inexpensive method of transporting heavy or bulky cargo or a large number of passengers by means of a self-controlled glider or train of self-controlled gliders which may be towed by a relatively small, light, inexpensive, fast, powered aircraft.

Another specific object of my invention is to provide light weight, accurate, and inexpensive control mechanism for a glider operable to control the flight attitude of the glider in response to deviations of a towing cable from a predetermined direction relative to an axis of the glider.

Further objects and advantages of the invention will be apparent from the following detailed description taken with the accompanying drawings, of which Fig. 1 is a side elevation showing the normal relative position of a towing aircraft and towed glider in flight;

Fig. 2 is a side elevation showing the positions in flight when the glider is too high relative to the towing aircraft;

Fig. 3 is a side elevation showing the positions in flight when the glider is too low relative to the towing aircraft;

Fig. 4 is a perspective view of the forward portion of a glider according to the invention showing the feeler and tow rope in operative position;

Fig. 7 is a top view of the coupling device on the tip of the feeler; and

Fig. 8 is an end view of the coupling device as seen, partially in section, from the base of the feeler.

Figure 5:
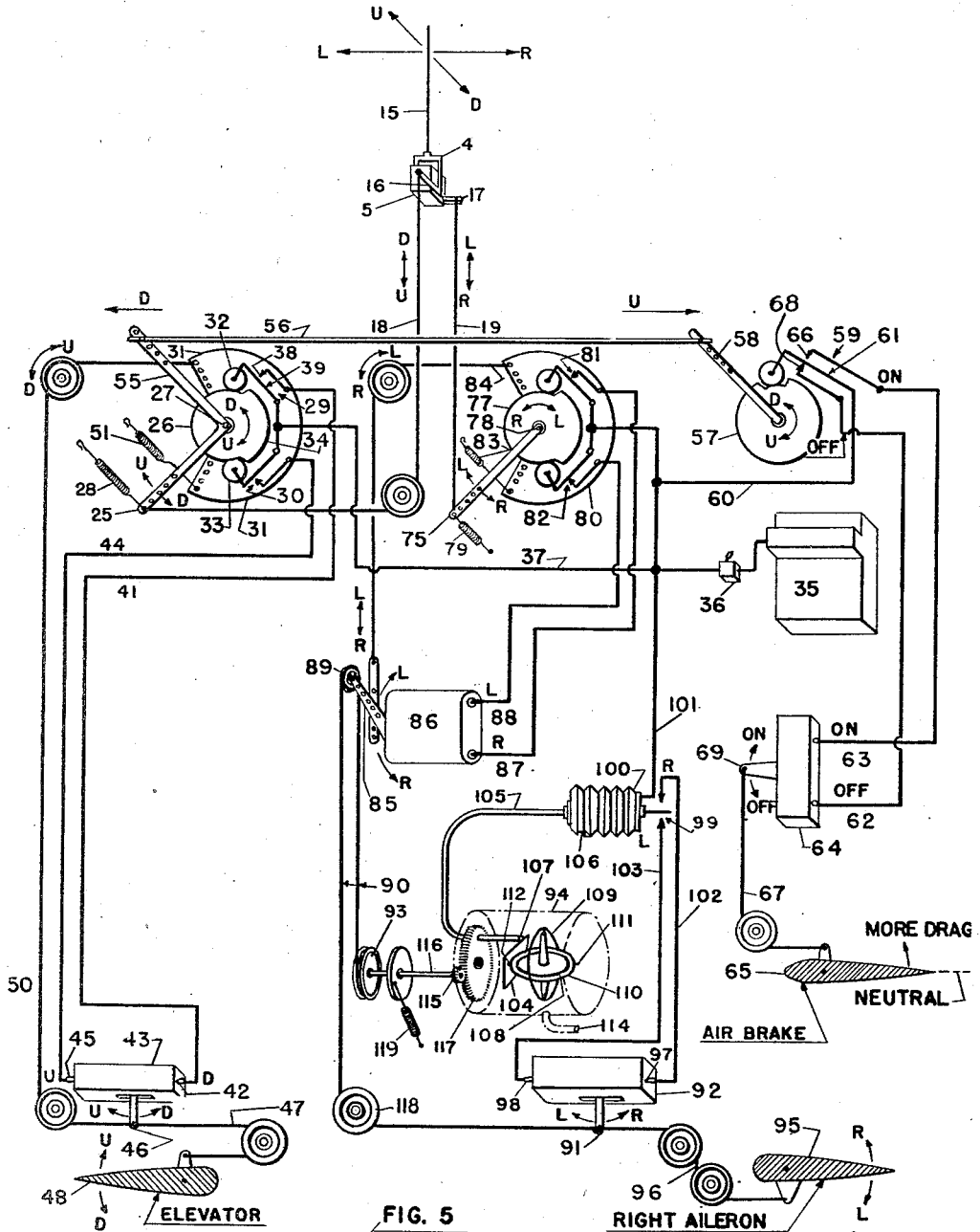
Fig. 5 is a diagrammatic view illustrating a control system according to my invention.

The principle on which the operation of the mechanism of my invention depends is illustrated by Figs. 1, 2 and 3 of the drawings. A glider 1 is shown under tow by a towing cable 2 and towing aircraft 3. In Fig. 1 the glider is shown in the correct vertical position behind the towing aircraft. In this position the upward component of the force of the air on the towing cable is substantially equal to the weight of the towing cable. When this condition exists, it is apparent that the towing cable will closely approximate a straight line throughout its whole length. It has been found experimentallly that for straight and level flight the desired angle between the towing cable and the horizontal will be of approximately 9°, although it will be understood that while this angle is proper for one set of conditions, the proper angle may be larger or smaller depending on the weight and diameter of the towing cable and other circumstances of any particular case.

If the glider is flying higher than at the desired angle with respect to the towing aircraft, as shown in Fig. 2, it will be seen that the cable drops sharply in front of the glider. In this position the weight of the towing cable is not supported entirely by the force of the air but is supported in part by the towing aircraft and in part by the glider. The cable therefore sags or bows downward between the ends, the bow or sag being sharpest near the glider because of the wind action and because the glider will under all normal conditions continue to be somewhat lower in altitude than the towing aircraft, though higher than the preferred relative altitude. In case the glider drops too low, or the towing aircraft climbs, the cable will be bowed upward as shown in Fig. 3. The glider is shown at greater than the desired angle below the horizontal from the towing aircraft. At this angle, the upward force of the air flowing by the cable more than equals the weight of the cable. The cable now pulls up on the nose of glider causing a sharp upward bow of the cable near the glider, as shown in Fig. 3.

In order to insure that upward or downward bowing of the towing cable corresponds accurately to downward or upward displacement, respectively, of the glider from the desired position, vertical bowing of the cable is operative, as later described, to actuate a spoiler or air brake to increase the wind drag of the glider, which increases the tension on the towing cable. Bowing caused by short gusts and similar inconsequential, momentary or inaccurate bowing will thus be pulled out of the line, and final corrective measures to the elevator airfoils of the towed aircraft will be made more accurately dependent on true dislocation which should be corrected.

To take advantage of the displacement from the preferred position of the cable when the glider is too high or too low, a rod or feeler extends from the nose of the glider and is attached by a split ring at its tip encircling the cable. The feeler is attached at its base by a universal joint to the nose of the glider so arranged that the feeler may follow the towing cable in lateral or vertical motion. The feeler will point upward (relative to the normal position of Fig. 1) when the glider is too low as in Fig. 3, or it will point relatively downward when the glider is too high as in Fig. 2.

It will be apparent that if the towing aircraft turns to the left, the towing cable will be pulled in that direction. The feeler will, in practice, point in a lateral direction almost exactly toward the towing aircraft. Thus if the towing aircraft is 10 degrees to the left of the longitudinal axis, or line of flight, of the glider, the towing cable will be substantially 10 degrees from the longitudinal axis. The bowing effect described for vertical displacement, as shown in Figs. 2 and 3, will be present very little or not at all in the case of a purely lateral displacement of the glider. In other words, vertical displacement is magnified by the bowing of the cable, causing the feeler to point above the towing aircraft in case the glider is too low or below the towing aircraft if the glider is too high, but this magnification is not present for lateral misalignment of the glider and the towing aircraft.

Fig. 4 of the drawings shows the method of attachment of the towing cable to the nose of the glider as well as some of the details of the feeler. The end of towing cable 2 is tied or spliced to an elongated metal ring 6 adapted to slip over arm 7 which is pivotally mounted by pin 8 to a bracket 9. The bracket is secured to the glider frame by welding, bolting or riveting and carries a trigger arm 10 pivoted on pin 12 and arranged to hold arm 7 against forward motion until the trigger arm is moved by a pull on cable 13. Arm 7 is spring loaded by tension spring 21 against the restraining catch of trigger arm 10 so that when cable 13 is pulled, the trigger arm rotates about pivot pin 12 against the force of compression spring 22 releasing arm 7 for rotation in the direction to release ring 6 in response to the tension of spring 21 and the pull of ring 6 on the arm. Suitable electric, mechanical, or manual means, or a combination thereof, are provided in the glider to pull cable 13 to actuate the trigger.

Feeler 15 is mounted near the nose of the glider by a single universal joint, of which one yoke 14 is securely fastened to the glider frame. The jaws of yoke 14 are arranged one above the other to permit pivoting of a rectangular block 5 on a vertical pivot between the jaws. Block 5 carries an arm 17 extending laterally to the right of the block. Yoke 4 of the universal joint is mounted to the base end of feeler 15 and the jaws of the yoke are arranged horizontally to extend along opposite sides of block 5. A horizontal pivot is provided to mount yoke 4 to block 5 and permit the yoke to rotate in a vertical plane with respect to the block. The axis of the horizontal pivot for yoke 4 and the axis of the vertical pivot for block 5 intersect at a point near the center of block 5. A vertically extending arm 16 is carried by one jaw of yoke 4. Cables 18 and 19 are respectively connected near the extended ends of arms 16 and 17.

In operation, a downward displacement of the tip of feeler 15 causes yoke 4 to slant downward toward its forward end rotating around the horizontal pivot in a direction that would appear clockwise in Fig. 4, and the end of arm 16 moves forward pulling cable 18 forward. An upward movement of the feeler tip will result in a paying out of cable 18 toward the rear. Movement of the feeler tip to the right as viewed looking forward in Fig. 4 causes block 5 to rotate about the vertical pivot moving the end of arm 17 and paying out cable 19 to the rear. Very little motion of arm 16 results from lateral movements of the feeler tip and no movement of arm 17 results from vertical motion of the feeler tip, but substantial forward and rearward movements of the end of arm 16 and of cable 18 result from downward and upward movements, respectively, of the tip, and substantial forward and rearward movements of the end of arm 17 and of cable 19 result from left and right movements, respectively, of the tip. The two cables 18 and 19 are connected to control mechanism within the glider as described later in connection with Figs. 5 and 6 of the drawings. The forward end or tip of feeler 15 is held close to the towing cable 2 by a quick-detachable device 20 which comprises a split ring attached to and disposed above the feeler rod and surrounding the cable in a snug running fit. This device is described in detail in connection with Figs. 7 and 8. Downward displacement of the towing cable will cause downward displacement of the feeler tip and a resultant pull on cable 18, whereas upward displacement of the towing cable will result in a paying out of cable 18. Similarly, a displacement of the towing cable and feeler tip laterally toward the left will result in a pull on cable 19, or toward the right a paying out of cable 19.

The control system of which the feeler mechanism provides the primary intelligence component is diagrammatically presented in Fig. 5. Cables 18 and 19 are utilized to selectively energize cam operated switches which cooperate with electrical trim motors and servo-motors to properly adjust control airfoil positions to cause the glider to assume a flight attitude tending to correct for misalignment of the glider flight path and the direction of the towing cable with respect thereto.

Cable 18, through which climb and dive indications are transmitted, is guided over one or more free turning pulley wheels and is connected at its end to an arm 25 rigidly mounted to an insulated cam member 26 rotatable about an axis at 27. Arm 25 is suitably tensioned against counterclockwise rotation by a spring 28. Electrical switches 29 and 30 are mounted on a preferably flat plate 31 which is rotatable on axis 27 independently of cam member 26. Switches 29 and 30 have suitable rollers 32 and 33 to follow the cam surface of member 26, the switches being respectively closed whenever raised portion 34 of member 26 comes in contact with either of the respective rollers. Swith 29 is so connected as to complete an electrical circuit from battery 35 through a manual on-off switch 36 and conductor 37 to contacts 39 and 38 of switch 29 and thence through conductor 41 to terminal 42 of servo-motor 43. One terminal of battery 35 is grounded to constitute a return circuit from servo-motor 43 and from other electrical apparatus in the glider. Switch 30 is similarly connected so that when closed it will complete a circuit from the battery through conductor 44 to terminal 45 of servo-motor 43. Arm 46 of this servo-motor is arranged to rotate in the direction to apply up-elevator control to elevator airfoil 48 through cable 47 when energy is applied through switch 30 to terminal 45 of the servo-motor, or to apply down-elevator control when energy is applied through switch 29 to terminal 42 of the servo-motor. An additional cable 50 is guided over suitable free turning pulleys and is connected to plate 31 in such a way as to cause counterclockwise rotation of the plate in response to a counterclockwise rotation of arm 46, which produces down-elevator control. Plate 31 is spring tensioned against counterclockwise rotation by spring 51, which serves to rotate the plate in a clockwise direction in response to clockwise, or up-elevator, rotation of servo-motor arm 46 and to hold taut cable 50.

As extended portion of cam arm 25 forms an additional arm 55 extending at substantially a right angle from arm 25. Motions of arms 25 and 55 are transmitted by a rod 56 attached to arm 55 to a cam member 57 through an arm 58 rigidly mounted to the cam. Double throw switch 59 is adapted through cooperation with the cam surface of member 57 to provide an electrical connection from battery 35 through on-off switch 36, conductor 60 and contact 61 selectively to one or the other of two terminals 62 and 63 of servo-motor 64 adapted to control the position of air-brake or spoiler airfoil 65, either rotation of cam member 57 being effective to move contact 61 into connection with contact 66 completing the circuit from the battery to terminal 63 of servo-motor 64. Power to terminal 63 is effective to cause clockwise rotation of servo-motor arm 69 which through cable 67 raises the air-brake or spoiler airfoil 65 causing increased air drag of the glider for purposes previously described. The spoiler may conveniently comprise an airfoil which in "down" position forms part of the streamlined upper wing surface of the glider and in "up" position forms an airfoil substantially perpendicular to and extending upwardly from the top wing surface slightly behind the leading edge of the wing. The "up" position of the airfoil greatly increases the drag of the wing by spoiling the smooth flow of air across the upper wing surface. Rotation toward neutral of arms 25 and 55 will be effective to excite servo-motor 64 through switch contact 61, contact 68 and terminal 62 for counterclockwise rotation of arm 69 which causes downward motion of air-brake or spoiler 65 to neutral streamlined position. A suitable automatically resetting limit switch (not shown) may be provided to disconnect terminal 62 from switch contact 68 upon movement of the airfoil 65 into streamlined or minimum drag position, and another similar limit switch (not shown) may be provided to disconnect terminal 63 from switch contact 66 upon movement of airfoil 65 into maximum up or drag position.

Cable 19, which is responsive to lateral motion of the feeler, is fastened to arm 75 attached to switch-operating cam member 77 adapted to rotate about an axis 78. Arm 75 is spring tensioned against clockwise movement by a coil spring 79, which also tends to hold taut cable 19. Plate 80, on which cam operated switches 81 and 82 are carried, is rotatably mounted on axis 78 for motion independent of cam member 77. Spring 83 tensions plate 80 against counterclockwise rotation caused by follow-up cable 84, which is held taut by the spring action. Cable 84 is attached at its end to an arm 85 of trim motor 86. Electrical connections to the trim motor terminals 87 and 88 are selectively completed through switches 81 and 82, switch 81 being closed to provide power to terminal 87 to cause counterclockwise rotation (downward) of trim motor arm 85 in response to counterclockwise rotation of cam member 77, switch 82 being alternatively closed to cause clockwise rotation of trim motor arm 85 in response to clockwise rotation of cam member 77. Arm 85 carries at its outer end a free-turning pulley 89 over which is carried a follow-up cable 90 attached at one end to the arm 91 of aileron servo-motor 92 and at its other end wound around a reel 93 arranged to adjust the stabilization axis of a roll gyroscope 94 in accordance with the rotative position of the reel 93. Servo-motor arm 91 serves to change the angle of attack of aileron 95 through cable 96. For simplicity only the right aileron is shown, although a left aileron is, of course, also provided to be oppositely controlled by servo-motor arm 91. Terminals 97 and 98 of servo-motor 92 are selectively furnished current through Sylphon actuated switch 99, expansion of Sylphon 100 causing switch 99 to complete a circuit from battery 35, switch 36 and conductor 101 to conductor 102 and terminal 97, whereas contraction of the Sylphon completes a circuit from the battery to conductor 103 and terminal 98. Sylphon 100 expands and contracts in accordance with the amount of suction applied through tube 105, the suction being determined by the position of a vane 104 within the case of gyroscope 94 with respect to the open end or nozzle 107 of tube 105. A bleed hole 106 in the Sylphon open to the atmosphere allows a relatively small air intake to the Sylphon to permit expansion when the suction is substantially cut off and to cause completion through switch 99 of the circuit to conductor 102, whereas application of increased suction will cause contraction of the Sylphon and closing of switch 99 in the opposite position to provide current to conductor 103. The size of the bleed hole is such that when vane 104 half covers end 107 of the suction tube, the amount of suction applied from the case of the gyroscope 94 is sufficient to overcome the air intake through bleed hole 106 to such an extent that the pressure in the Sylphon is enough below atmospheric pressure to hold the Sylphon in a mid-position, so that the switch 99 is in open position. A slight uncovering of end 107 from the mid-position results in closing the contact to conductor 103, whereas a slight additional covering results in closing the contact to conductor 102.

Gyroscope 94 is provided for roll stability of the glider, maintaining through aileron adjustments an even keel when the glider is not turning, and providing through actions of follow-up cable 90 sufficient roll during turns to prevent slide-slip. Vacuum, preferably from an external vacuum Pitot tube in the airstream surrounding the glider, is applied to the case of gyroscope 94 through tubing 114. A suitable rotor 108, which may be electrically or air driven, is mounted on gimbals 109 and 110. The outer gimbal 110 arranged to be normally horizontal when the glider is in level flight, not climbing or diving, is pivoted at points 111 and 112 to permit tilting of the gyroscope case with respect to the rotor and gimbals when the glider rolls. Vane 104 is securely fastened near pivot point 112 to gimbal 110 extending in a tangential direction thereto and arranged to remain stationary with the gimbal when the gyroscope case tilts in response to roll of the glider with respect to the rotor and gimbal 110. Pivots 111 and 112 are arranged parallel to the longitudinal axis of the gyroscope case, which is in turn arranged substantially parallel to the longitudinal axis of the glider. A roll of the glider to the right, since the gyroscope case rolls with the glider, will cause the stationary vane 104 to uncover nozzle 107 since nozzle 107 rolls with the case. Uncovering the nozzle increased the vacuum applied to tube 105 and Sylphon 100; the Sylphon contracts causing switch 99 to close to provide current to conductor 103 and terminal 98, servo-motor 92 rotates arm 91 clockwise giving "down" right aileron, which tends to cause the glider to roll toward the left and counteract the original roll toward the right.

Right or left movements of feeler 15 are transmitted through cable 19 and arm 75 to cam 77 which will rotate clockwise in response to a leftward movement of the feeler. Such rotation causes switch 82 to close as the roller of the switch rides up on the raised portion of the cam, providing energy to terminal 88 of trim motor 86. The trim motor arm 85 rotates upward, in the direction of arrow L, paying out cable 84 toward plate 80, which allows spring 83 to rotate plate 80 clockwise far enough to allow switch 82, moving with the plate 80 to reopen as the roller leaves the raised portion of the cam. When the upward rotation of trim motor arm 89 takes place, cable 90 is pulled. One end of the cable being attached to arm 91 of servo-motor 92 which does not move immediately, the cable is unwound at the other end from cable reel 93 which turns a gear 115 through shaft 116. Gear 115 cooperates with gear 117, which carries nozzle 107 at the end of flexible tube 105. Unwinding of the cable from the cable reel 93 thus changes the stabilization axis of the gyroscope by changing the position of nozzle 107 to move it into uncovered position away from vane 104. Sylphon 100 contracts due to the increased suction through nozzle 107, closing switch 99 to apply energy to terminal 98 of servo-motor 92. Arm 91 moves clockwise causing right aileron 95 to move downward, in the direction of arrow L, and the left aileron (not shown) to move upward, to produce a leftward roll of the glider. At the same time arm 91 slacks off cable 90 which runs through free turning pulleys 118 and 89 and permits slight rewinding of the cable on reel 93 under the tension of spring 119, causing nozzle 107 to move toward vane 104 until the nozzle is half covered by the vane, at which time Sylphon 100 expands enough to center switch 99 in the "off" position, stopping motion of servo-motor arm 91. As the glider rolls to the left in response to the aileron settings, gyroscope case 94 rolls, being securely fastened in the glider, but rotor 108 remains in horizontal position and maintains gimbal 110 in horizontal position. Vane 104 being attached to gimbal 110 also remains stationary, but nozzle 107 will be moved with the gyroscope case 94, without further winding or unwinding of cable 90 on reel 93, and will come under vane 104, causing Sylphon 100 to expand to close the circuit through switch 99 to terminal 97. Arm 91 accordingly moves counterclockwise to return the ailerons toward neutral, this motion continuing until the resulting pull on cable 90 from arm 91 has returned nozzle 107 by actuation through the gears 115 and 117 to half covered position. The net effect of these motions is to cause, in response to a leftward movement of feeler 15, substantial "left aileron" control very quickly, and then a reduction in the deflection of the ailerons as the glider rolls toward the left until at the maximum roll of the glider for a given displacement of the feeler, the ailerons are again centered. The glider remains in this position as long as the displacement of the feeler remains constant being under the control of the gyroscope, the stabilization axis of which will be at some angle to the horizontal, since the raised position of the arm 85 and pulley 89, toward "L," causes the system including the gyroscope 94, Sylphon 100, servo-motor 92 and associated apparatus to become balanced under a new condition in which cable 90 is, in effect, shortened. A rightward feeler movement causes a roll to the right by closing cam switch 81 to provide battery power to terminal 87 of roll trim motor 86 which produces counterclockwise rotation of arm 85 in a downward direction allowing reel 93 to reel in cable 90, which rotates gear 117 to cover nozzle 107 and apply decreased suction to Sylphon 100, closing switch 99 to provide electric energy from battery 35 and conductor 101 to terminal 97 of servo-motor 92, which through arm 91 and cable 96 applies upward deflection of right aileron 95, and downward deflection of the left aileron (not shown). Cable 90 is pulled, by arm 91, over pulleys 118 and 89 to unwind from reel 93 and again half cover nozzle 107 to open the circuit to and thereby stop servo-motor 92. As the glider rolls rightward in response to this aileron setting, vane 104 of gyroscope 94 further uncovers nozzle 107 to apply current to terminal 98 of servo-motor which is effective to return the ailerons toward neutral position. This action continues until the glider has assumed a roll of an amount bearing a predetermined proportion to the amount of rightward feeler displacement. The gyroscope acts to provide right or left aileron control as required to maintain the glider in this amount of roll until the feeler is again moved laterally to establish a new position. The action of the gyroscope is such that the glider will be made to seek the position of roll at which the nozzle 107 will be half covered by stationary vane 104. The stabilization axis of the gyroscope is changed by changing the position of the nozzle with respect to the gyroscope case, so that the glider and gyroscope case must be rolled about the stationary vane 104, the vane remaining stationary against rolling since it is mounted to outer gimbal 110 carrying the inner gimbal 109, to bring the nozzle into half covered position under the vane.

Upward displacement of the feeler will result in paying out of cable 18, because of motion transmitted through arm 16, in the direction of arrow U under the tension of spring 28. Arm 25 and extended portion 55 will rotate clockwise, around pivot 27, as will cam member 26 to which the arm is mounted. Roller 33 will ride up on raised portion 34 of the cam, closing switch 30 providing electric energy from battery 35 through switch 36 and conductor 37 to conductor 44 and terminal 45 of servo-motor 43. Arm 46 moves clockwise in the direction of arrow U to pull cable 47 deflecting elevator 48 toward climb position, as indicated by arrow U, and to pay out cable 50. As cable 50 is paid out around suitable free turning pulleys, plate 31 is permitted to rotate clockwise in response to the tension of spring 51. Switch 30 being mounted on plate 31 moves until roller 33 drops off raised portion 34 allowing the switch to open de-energizing servo-motor 43 and stopping the motions of arm 46, cables 50 and 47, elevator 48, and plate 31. As arm 55 rotates, as mentioned above, rod 56 is moved longitudinally to the right as shown by arrow U, rotating arm 58 and cam 57 clockwise around a center pivot, since the arm is mounted to the cam. Slight rotation of cam 57 causes switch blade 61 to break contact with contact 68 and make contact with contact 66 closing a circuit from battery 35 through switch 36 and conductor 60 to contact 66 and terminal 63 of servo-motor 64. The servo-motor arm 69 is rotated, in the direction of arrow On, to pull cable 67 and raise air-brake or spoiler 65 toward the "more drag" position. If the switch 59 remains in the "on" position for sufficient time to raise the air-brake to its limit position, an automatically resetting limit switch (not shown) disconnects contact 66 from terminal 63. A similar limit switch is also provided to disconnect contact 68 of switch 59 from terminal 62 when the air-brake is in streamlined or neutral position, it being understood that these limit switches automatically reconnect the terminals to the respective contact whenever the air-brake is moved from its limit positions. The limit switches may be conveniently built into servo-motor 64 in a known manner.

Similar limit switching arrangements may be built into servo-motor 43 to prevent deflection of elevator 48 beyond certain limits in the up and down directions, and into servo-motor 92 to limit aileron deflection, these switches causing the appropriate connections to the servo-motors to be disconnected to prevent the servo-motors from tending to deflect the control airfoils beyond a desirable maximum limit.

Downward feeler displacement operates to pull cable 18 in the direction of arrow D and close switch 29 to provide an electrical connection from battery 35 through switch 36, conductor 37 and switch blade 39 to switch blade 38 and conductor 41 to terminal 42 of servo-motor 43, resulting in movement of servo-motor arm 46 toward arrow D to give down elevator control through cable 47 and to pull cable 50 to turn plate 31 counterclockwise, moving switch 29 until roller 32 drops off raised portion 34 of cam 26 opening the switch and taking power off servo-motor 43. Pulling of cable 18 is also effective through arms 25 and 55, rod 56, arm 58, cam 57 and switch 59 to apply power to the "on" terminal of servo-motor 64, which then raises air-brake 65 toward the "more drag" position.

Return of the air-brake 65 to the neutral or streamlined position takes place whenever the feeler is brought into the vertical position indicating proper vertical direction of the towing cable, since this results in applying power to terminal 62 through contact 68. The elevator, however, because of the follow-up system including cable 50 and rotating plate 31 starts to return toward neutral position from a climb or dive position as the feeler starts to return toward the predetermined desired vertical position. Aileron control by the feeler is affected by the gyroscope and follow-up system so that aileron deflection in response to lateral feeler displacement continues only until the glider has rolled into the desired position, then the ailerons are returned to centered position to maintain the rolled position of the glider until the feeler starts to return toward lateral neutral position, at which the towing cable is straight ahead. As the feeler starts to return, the ailerons are deflected in the direction to right the glider. Hence, as long as the feeler is vertically displaced, up or down elevator will be applied and the spoiler will be maintained in drag position. The amount of elevator application will be substantially proportionate to the amount of feeler displacement, but the amount of spoiler application is relatively independent of the amount of feeler displacement, maximum drag position of the spoiler being obtained whenever the feeler is vertically displaced beyond a minimum amount for more than a minimum time. Aileron deflection is applied only insofar as necessary to cause the glider to roll, the amount of roll rather than the aileron deflection being substantially proportionate to the lateral feeler displacement. Rudder control is not affected by feeler displacements in the preferred embodiment. However, if under certain circumstances it is desired to provide rudder control, it may be accomplished by using roll trim motor 86 as a rudder servo-motor in addition to its described function as a trim motor. It has been found in practice for the glider application described that the lateral pull by the towing cable on the nose of the glider is enough to cause the glider to turn at a desirable rate without the application of rudder correction. Accordingly, in the preferred embodiment aileron control only is applied in a turn to prevent side-slip, and yaw is accomplished by the normal tendency of the glider to follow the towing cable.

Figure 6:
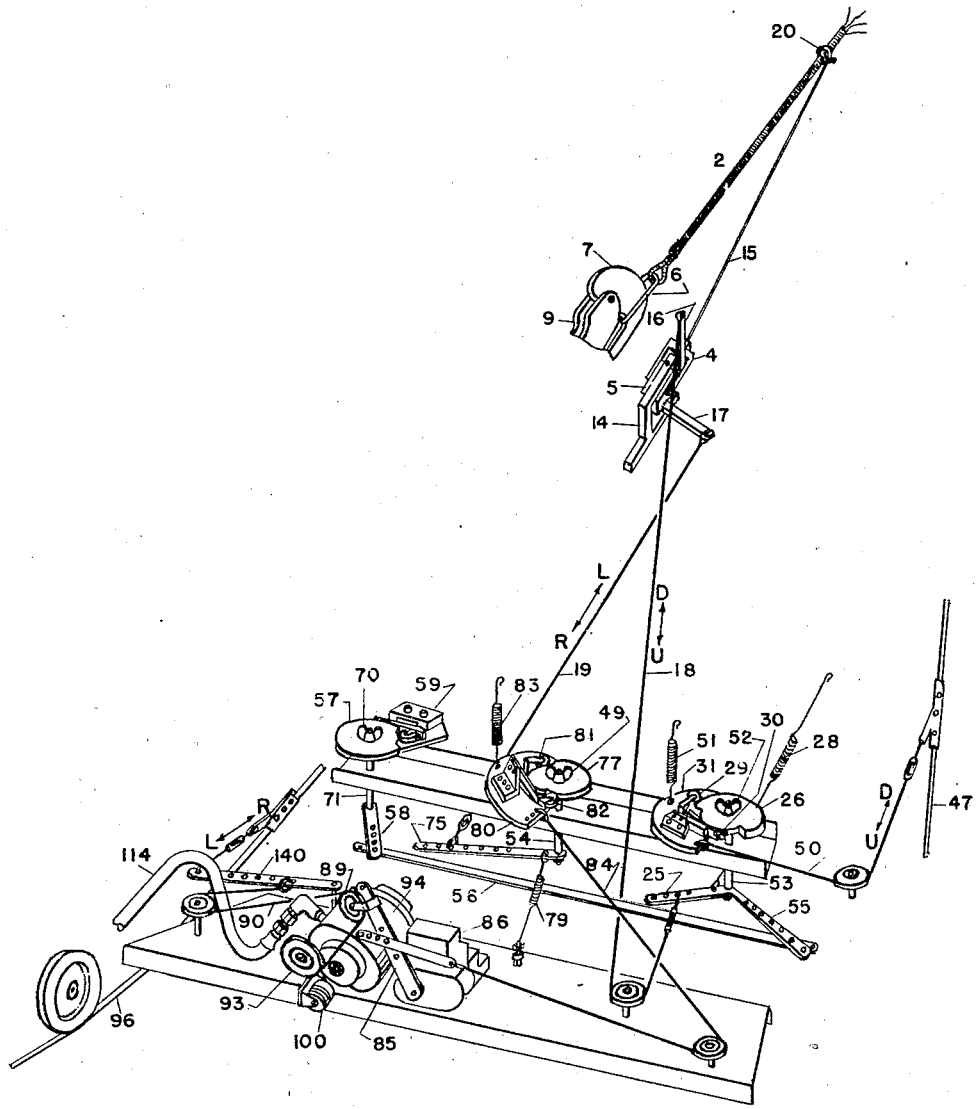
Fig. 6 is a perspective view of a portion of the control mechanism.

The portion of the control mechanism dealing principally with the follow-up system is shown in its physical arrangement in Fig. 6. Feeler rod 15 is held in cooperative relationship with towing cable 2 by quick-detachable device 20. Extending arms 16 and 17 transmit indications through control cables 18 and 19 of towing cable movements and resultant feeler movements to arms 25 and 75 respectively, the arms being effective through shafts 53 and 54 to rotate cams 26 and 77 so as to close switch 29 in response to downward feeler movements, or switch 30 in response to upward movements, and to close switch 82 in response to leftward, or switch 81 in response to rightward movements of the feeler. Cables 18 and 19 are tensioned respectively by tension springs 28 and 79. Upward or downward motion of the feeler moves arms 25 and 55, and this motion is transmitted through rod 56 to arm 58 and shaft 71 to cam 57 to cause closing of switch 59 for application of the spoiler or air-brake. The switches 59, 81, 82, 29 and 30 are electrically connected as previously described to trim and servo-motors for operation of the control surfaces of the glider. Plate 31, on which are mounted elevator servo-motor control switches 29 and 30, is tensioned by spring 51 against cable 50. The cable 50 follows movements of elevator control cable 47, through which elevator movements are accomplished by a servo-motor. The plate 31 is free to rotate about shaft 53 under the control of cable 50 and spring 51. Adjustments to the system are conveniently provided by setting the cam 26 in selected rotative position on shaft 53, wing nut 52 being provided to loosen the cam on the shaft and to permit clamping of the cam when proper position is obtained. Similar arrangements are made for setting the positions of cams 77 and 57 on shafts 54 and 71 respectively, and for clamping them in the desired positions with wing nuts 49 and 70. It has been found desirable under certain circumstances to provide a geared vernier mechanism to make corrections to the setting of each cam. If vernier mechanism is provided, it is possible to accurately and easily make large or small changes in the rotative position of the cams on the respective shafts merely by manually turning a vernier knob, and because of the high gear ratio of the vernier, the cam tends to remain in the new setting, though in most applications it will be found desirable to provide locking nuts in addition to the vernier mechanisms to prevent any change of settings due to vibration. Plate 80 carries roll control (aileron) switches 81 and 82 and is tensioned by spring 83 against rotation by cable 84. As explained in connection with Fig. 5, these switches selectively complete electrical connections to roll trim motor 86 in response to lateral feeler movements. Motor 86 rotates arm 85 and adjusts through cable 84 the rotative position of plate 80, and also changes the effective length of cable 96 to reset the stabilization axis of roll gyroscope 94. As previously explained in connection with Fig. 5, Sylphon 100 actuates switching mechanism to operate an aileron servo-motor, which in turn adjusts the angle of attack of the ailerons through control cable 96. Follow-up of aileron settings is effected through cable 90. A lever 140 may be inserted in cable 90 to proportionately reduce the motion of cable 96 as desirable for application to pulley 63 for changing the stabilization axis of the gyroscope. A partial vacuum is applied to the gyroscope case through tube 114 which leads to a Pitot vacuum tube external to the glider.

It will be apparent that in the control system hydraulic valves may be substituted for the electrical cam-operated switches, and that hydraulic servo-motors may be provided, if an hydraulic system is desired rather than an electric. It will also appear that there may simply be mechanical coupling from the feeler cables 18 and 19 to the control airfoils if the control airfoils are so balanced that the relatively small control forces transmitted by the feeler cables are sufficient to directly control the airfoils. This would eliminate the necessity for electric or hydraulic amplification of the controlling signals, although the amplification of the signals transmitted by cables 18 and 19 as described is to be preferred in most applications of the invention.

It will also be apparent that roll stabilization may be accomplished by other means than by the use of the gyroscope described. Certain pendulum arrangements, for instance, may be adapted for this purpose.

The arrangement described may be applied when part or substantially all of the propelling power for the towed aircraft is furnished by a suitable engine in the towed aircraft, the engine being of the propeller, jet, or rocket propulsion type.

A suitable device for holding the tip of feeler 15 in close relationship to the towing cable for the glider at a distance forward of the nose of the glider is shown in detail in Figs. 7 and 8, being indicated generally at 20 in Fig. 4. As shown in the top view, Fig. 7, the device comprises a block 125, which may be of any convenient shape, with vertical flat bearing faces 126 and 127. These faces are arranged on opposite sides of the block and at an angle to each other of approximately 60° in the preferred arrangement, although an angle of from approximately 30° to an angle of 90° or more may prove satisfactory. Each face is circular in shape, and from the center of each extends a pin threaded at the outer end. The axis of one pin 128 intersects the axis of the other pin 129 at a point in the lateral center of the block. The axes will intersect at an angle of 120°, if the faces are 60° to each other, the axis of each pin being perpendicular to the surface of the face on which the pin is mounted. The forward end of feeler rod 15 is securely attached to the block 125 and is shown as being looped around the block and welded to it. The block portion of the device, that is, the part described above, may be conveniently made by forming a relatively tight loop in the forward end of the feeler rod and by welding a flat headed bolt in the desired position on each side of the loop. The bolts are arranged with the heads inward, the body of the bolts constituting the outwardly extending partially threaded pins, and the surfaces of the heads adjacent to the body portions forming the circular bearing faces. Members 130 and 131 are pivoted on the pins 128 and 129, being held on the pins by nuts 138 and 139. The members 130 and 131 comprise curved upper portions adapted when brought together at 132 to form a loop to encircle the towing cable, and lower portions for mounting on the pins 128 and 129. Members 130 and 131 as shown in Fig. 7 and Fig. 8 meet at 132 when in closed position. The lower portion of member 130 comprises an annular part, the hole drilled in the center being adapted to fit over pin 128. The axis of this hole is at a 30° angle from the plane of the upper section of each of members 130 and 131, that is a plane which would be perpendicular to the axis of the loop formed by members 130 and 131 when positioned as in Fig. 8. The sides of each of the annular lower parts are flattened to form faces parallel to each other and perpendicular to the axis of the hole drilled in the part. Members 130 and 131 are formed alike except that the faces of the annular members, and the axes of the holes therein, are twisted oppositely for the two members 130 and 131 as will be evident from the drawings. The 30° angles between the drilled hole and the plane of the upper section of each member are such that when the axes of the pins are 120° apart, the two members may be mounted on the respective pins and the upper sections will form a loop when the members are in the position shown in Fig. 8. Because the axes of the two pins are separated by an angle of 120°, it will be apparent that a pivoting of members 130 and 131 about the pins in one direction will tend to separate the members. Thus if the members are pivoted into the positions shown in broken lines at 130A and 131A in Fig. 7, the loop will separate at 132 and the two halves of the loop will fall away from the towing cable that was originally held inside the loop. The members will extend at substantially 60° from each other in the broken line position since the faces 126 and 127 are at 60° from each other and the members extend substantially parallel to the respective faces. Thus, since the faces are vertical, the members will be parallel when in a vertical position, as shown in the solid lines of Figs. 7 and 8. Tension springs 135 and 136 are arranged to tension the members 130 and 131 toward vertical position. The springs are connected at one end, as shown in Figs. 7 and 8, to a plate 137 welded or similarly secured to feeler rod 15 a short distance from the tip, and at the other end to the respective members 130 and 131 slightly above the lower annular portions of each member.

The device permits quick and easy attachment to and release from the towing cable. When it is desired to connect the loop formed by members 130 and 131 around the towing cable, the members are pulled by hand into the spread position indicated by broken lines in Fig. 7, the tip of the feeler is brought up close to the cable, and the members are released to snap, under spring tension, around the cable. The device may be manually released from the cable by pulling the members back to open position. Automatic release of the device is accomplished when towing cable release arm 7, in Fig 4, is triggered to swing forward to drop ring 6. The cable is pulled forward through the loop of the device until the enlarged portion of the cable near ring 6 strikes the members 130 and 131. These members are pulled forward by the enlarged portion of the cable and separate into the open position, at 130A and 131A, permitting the cable to fall free of the feeler.

While my invention is described as applied to a glider in tow behind another aircraft, it is apparent that the invention is also applicable for controlling any airplane, aerostat, or kite. In towing operations the tug may be a body moving on the surface of the earth or in the air. The craft under tow may be unpowered, such as a glider, captive balloon, or kite, or it may be powered, such as a dirigible or airplane. It is entirely practical, for instance, to tow one airplane when the propelling apparatus thereof is inoperative due to engine or propeller failure or the like behind a powdered aircraft by applying my invention to the disabled airplane. It will also be apparent that so long as the aircraft, be it airplane, glider, aerostat, or kite, has airspeed sufficient to make the controls effective, and to support it if heavier-than-air, the towing body may have negligible ground speed or may be stationary with respect to the ground. In addition it is contemplated that my invention may be applied to a towing aircraft to automatically cause it to take a desired relative position forward of the towed object. Alternatively, the invention may be applied to both the towing and towed objects to cause simultaneous corrections to be applied to each in response to deviations from the preferred positions, or one may be controlled for lateral and the other for altitude displacements. My invention may be applied also to undersea craft, such as submarines, under tow by a surface or aircraft or another submarine.

Although a mechanical feeler is described, it is contemplated that other means for indicating the relative direction of an object from the glider, or other aircraft or submarine, may be substituted. Thus my invention is intended to include the application of control signals to change the angle of attack of control planes of an aircraft or submarine in accordance with deviations from a desired direction of an object from the aircraft or submarine, the direction being determinable from any mechanical connection between the aircraft or submarine and the object, such as the cable described, or from the direction of a beam of light, sound, radio, or other energy beam connecting the two. It is only necessary that a device be provided that will be responsive to deviations from the preferred relative direction of the one body from the other.

My invention and the objects thereof as described above are intended to be exemplary only, and I desire to be limited only by the scope of the following claims.

The invention described herein may be manufactured and used by or for the Government of the United States of America for governmental purposes without the payment of any royalties thereon or therefor.

What I claim as new is:

1. In an aircraft, automatic means for causing said aircraft in flight to maintain a predetermined position relative to an external body comprising direction indicating means between said aircraft and said body, a feeler universally operated by said indicating means, and directional and pitch controls on said aircraft operable by said feeler.

2. In an aircraft, automatic means responsive to the direction of a body from said aircraft for controlling airfoils of said aircraft comprising direction indicating means between said aircraft and said body, a feeler universally operated by said indicating means, and aileron and elevator airfoils operated by said feeler.

3. A towed aircraft, feeler means for controlling the flight attitude of said towed aircraft, a towing body, direction indicating means including a towline between said aircraft and said body, said feeler means being operated by said direction indicating means to maintain said aircraft in a predetermined relative position below said body, whereby to keep said towline straight by a balance of its weight against the dynamic airpressure of the airstream preventing its tendency to sag.

4. In a control system, a body to be controlled, towing means connecting said body to an object, a separate member extending from said body responsive to the direction of said object from said body, controlling planes extending from said body, said planes being under the control of said member.

5. In an aircraft, an automatic control system comprising an external body, means for indicating the lateral direction of said external body from said aircraft, feeler means operated by said indicating means and power means controlled by said feeler means for changing the direction of said aircraft.

6. In an aircraft, an automatic control system comprising relative direction indicating means, feeler means operated by said indicating means, means for deflecting elevator airfoils of said aircraft and means for deflecting aileron airfoils of said aircraft, both of said latter means being under the control of said feeler means.

7. In an aircraft, means for automatically controlling said aircraft comprising directional and elevator control airfoils, an external body, direction indicating means between said aircraft and said body, feeler means operated by said indicating means, means for deflecting said directional control airfoils in response to a lateral deviation of said feeler means from a desired direction of an external body and means for deflecting said elevator control airfoils in response to a vertical deviation of said feeler means from said desired direction of said external body.

8. In an aircraft, means for automatically controlling said aircraft comprising an external body, direction indicating means between said aircraft and said body, feeler means on said aircraft operated by said direction indicating means, roll and pitch control airfoils, means for deflecting said roll control airfoils in response to a lateral deviation from a desired direction of said external body and means for deflecting said pitch control airfoils in response to a vertical deviation from said desired direction of said external body, said means for automatically controlling said aircraft being effective to cause said aircraft to tend to maintain a flight path determined by the desired relative direction of said body from said aircraft.

9. A control mechanism for an object moving in a fluid medium comprising a towline attached to said object, a rod-like member universally mounted on said object at one end and operated by said towline through a slip joint connection at its other end, means under the control of said member for controlling said object comprising a plane pivotally mounted to said object, said plane being arranged for cooperation with said fluid medium.

10. A flight control mechanism for a towed aircraft comprising a towing cable for said aircraft, angularly adjustable means on said aircraft held in operative relationship with said towing cable, said towing cable being connected directly to said aircraft through a quick detachable connector, a control airfoil on said aircraft, control apparatus for changing the angle of attack of said control airfoil in response to angular movement of said means with respect to a reference axis of said aircraft.

11. In combination, a towed aircraft, a towing aircraft, a towing cable extending from said towing aircraft to said towed aircraft, a rod having a slip joint connection at its outer end to said towing cable and mounted at its base by a universal joint to said towed aircraft, said rod being operated about said universal joint by said towing cable through said slip joint connection, an airfoil pivoted to said towed aircraft, apparatus for changing the angle of attack of said airfoil, and means for applying energy to said apparatus controlled by said rod.

12. A flight control device for a glider comprising a rod-like feeler mounted by a universal joint to the forward part of said glider, a towing cable detachably connected to the forward part of said glider, a quick-detachable connecting means to maintain the free end of said feeler in cooperation with said towing cable, said feeler being arranged to follow lateral and vertical displacement of said towing cable, a normally vertical extending member movable in response to vertical movements of said feeler, a normally horizontal extending member movable in response to lateral movements of said feeler, cam operated electrical switches in said glider, controlling airfoils on said glider cable means for mechanically transferring motions of said extending members to said cam operated electric switches, and electromechanical means controlled by said switches to actuate said controlling airfoils.

13. In towing one aircraft, having flight control mechanism, by another aircraft, the method of controlling the towed aircraft comprising using a flexible towline, determining the angle at which the towline will be drawn through the air at the speed of the aircraft without substantial sagging, indicating the relative direction of said towing aircraft with respect to the longitudinal axis of said towed aircraft, and actuating said control mechanism in accordance with said indications to make said direction correspond to said predetermined angle.

14. In combination with an airplane, a glider, means connecting said glider to said airplane for towing the glider at a specific angular position behind said airplane, contact means carried by said glider in contact with said connecting means, means carried by said connecting means for holding said contact means in contact with said connecting means, and control means in said glider responsive to any angular change of said connecting means with respect to said contact means for maneuvering the glider to a relative position to correct said angular relation.

15. In combination with an airplane, a glider, means connecting said glider to said airplane for towing the glider in any angular direction out of line with said airplane, contact means carried by said glider in contact with said connecting means, means carried by said connecting means for holding said contact means in contact with said connecting means, control means in said glider responsive to any angular change of said connecting means with respect to said glider for correcting said relation between said connecting means and said glider.

16. In combination with an airplane, a glider, means connecting said glider to said airplane, contact means carried by said glider in contact with said connecting means, means carried by said connecting means for holding said contact means in contact with said connecting means at a specified angle with respect to said glider, control means in said glider responsive to any angular change of said connecting means with respect to said contact holding means for maneuvering the glider back to its normal relative angular position to correct said angular change.

17. In combination, a towed aircraft having flight-controlling airfoils, a towing aircraft, a towing cable connecting the towed aircraft to the towing aircraft, a rod-like feeler universally mounted in the forward part of the towed aircraft, connecting means extending between the cable and the free end of the feeler for maintaining the free end of said feeler in cooperation with said cable, and means, operated in response to angular movement of said feeler, for moving the aforesaid flight-controlling airfoils to cause lateral and vertical movement of the towed aircraft, and acting to maintain the towed aircraft in a predetermined position relative to the towing aircraft.

MOULTON B. TAYLOR.

REFERENCES CITED

The following references are of record in the file of this patent:

UNITED STATES PATENTS

| Number | Name | Date |
|---|---|---|
| 1,165,731 | Webber | Dec. 29, 1915 |
| 1,418,335 | Sperry | June 6, 1922 |
| 1,690,578 | Hammond | Nov. 6, 1928 |
| 2,373,236 | Effinger | Apr. 10, 1945 |
| 2,396,453 | Windle | Mar. 12, 1946 |
| 2,397,476 | Maxson et al. | Apr. 2, 1946 |

FOREIGN PATENTS

| Number | Country | Date |
|---|---|---|
| 552,749 | Great Britain | Apr. 22, 1943 |
| 798,180 | France | Mar. 2, 1936 |